United States Patent [19]

Luciani et al.

[11] Patent Number: 5,529,966

[45] Date of Patent: Jun. 25, 1996

[54] CATALYST AND PROCESS FOR (CO)POLYMERIZING ALPHA-OLEFINS

[75] Inventors: Luciano Luciani, Ferrara; Federico Milani, S. Maria Maddalena; Liliana Gila, Trino; Evelina Ballato, Crusinallo, all of Italy

[73] Assignee: Enichem S.p.A., Milan, Italy

[21] Appl. No.: 138,980

[22] Filed: Oct. 21, 1993

[30] Foreign Application Priority Data

Oct. 30, 1992 [IT] Italy ................... MI92A2491

[51] Int. Cl.$^6$ .................................. B01J 31/00
[52] U.S. Cl. .................. 502/117; 502/103; 502/118; 502/153; 502/154; 526/160
[58] Field of Search ................... 502/103, 117, 502/118, 154, 153

[56] References Cited

U.S. PATENT DOCUMENTS 5,055,438  10/1991  Canich ................... 502/117

FOREIGN PATENT DOCUMENTS 0420436  4/1991  European Pat. Off. .

WO87/03887  7/1987  WIPO .

Primary Examiner—E. Rollins Cross
Assistant Examiner—E. D. Irzinski
Attorney, Agent, or Firm—Oblon, Spivak, McClelland, Maier & Neustadt

[57] ABSTRACT

A catalyst active in the polymerization of alpha-olefins is formed by:

(a) a bis(cyclopentadienyl) bis(amide) derivative of an element of Group IVB of the Periodic Table of the Elements, to be defined by means of the formula:

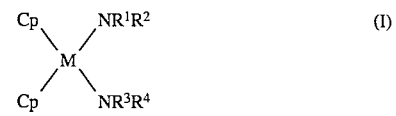

(I)

wherein M represents a metal of Group IVB, each of $R^1$, $R^2$, $R^3$ and $R^4$, and Cp have the same meaning as reported in the disclosure, and (b) an aluminoxane co-catalyst.

This catalyst finds use in the processes of ethylene and other alpha-olefins polymerization and copolymerization.

8 Claims, No Drawings

CATALYST AND PROCESS FOR (CO)POLYMERIZING ALPHA-OLEFINS

The present invention relates to a catalyst formed by a bis(cyclopentadienyl) bis(amide) derivative of an element of Group IVB of the Periodic Table of the Elements and an aluminoxane co-catalyst, and to its use in the (co)polymerization of ethylene and other alpha-olefins.

In the art, it is generally known that ethylene, or, in general, alpha-olefins, can be polymerized by means of the low-pressure process, with Ziegler-Natta catalysts.

The useful catalysts for the intended purpose are generally formed by a compound of a transition metal (elements of Groups from IV to VIII of the Periodic Table of the Elements), in mixture with an organometallic compound or hydride of the elements of Groups from I to III of said Periodic Table, by operating in suspension, in solution, or in the absence of solvents or diluents. For this known art, reference is made to the description by J. Boor, in "Ziegler-Natta Catalysts and Polymerization", Academic Press, New York (1979).

A particular class of catalysts active in olefin polymerization is constituted by the combination of an aluminoxane with a cyclopentadienylic derivative of such a metal as titanium, zirconium and hafnium (Group IVB), also referred to as "metallocenes", which can be defined by the following formula:

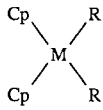
(II)

wherein M represents a metal of Group IVB of the Periodic Table of the Elements; each R represents a halogen atom, an alkyl group or an aryl group; and each Cp independently represents a cyclopentadienyl, indenyl or fluorenyl group. As to the prior art, reference is made to the description made by H. Sinn, W. Kaminsky, in Adv. Organomet. Chem. 18, 99 (1980) and in U.S. Pat. No. 4,542,199.

These catalysts display a high catalytic activity and the capability of producing polymers with desired characteristics as a function of the particular catalytic composition used and of the olefin, or olefin mixture, submitted to polymerization. Reference is made, for instance, the disclosures of U.S. Pat. No. Nos. 4,530,914; 4,935,474; 4,937,299; and 5,001,205; and of European patent application publication Nos. 35,242; 318,049; 384,171 and 387,609.

The present Applicant has found now, according to the present invention, that when they are used together with an aluminoxane, particular metallocenes containing substituted amidic groups in their molecular structure constitute extremely active catalysts in the polymerization of olefins.

Therefore, a purpose of the present invention is a polymerization catalyst formed by a metallocene containing substituted amidic groups and an aluminoxane.

Another purpose of the present invention are the processes for the (co)polymerization of ethylene and other alpha-olefins, which use said catalyst.

Further purposes of the present invention will be evident from the following disclosure.

Therefore, in a first aspect thereof, the present invention relates to a catalyst for the (co)polymerization of ethylene and other alpha-olefins, formed by:

(a) a bis(cyclopentadienyl) bis(amide) derivative of an element of Group IVB of the Periodic Table of the Elements, to be defined by means of the formula:

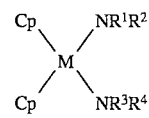
(I)

wherein: M represents a metal from Group IVB of the Periodic Table of the Elements, $R^1$, $R^2$, $R^3$ e $R^4$ represent, each of them independently from the other ones, an alkyl group of from 1 to 8 carbon atoms, a cycloalkyl group of from 5 to 8 carbon atoms, or a phenyl group; and each Cp independently represents a cyclopentadienyl, indenyl or fluorenyl group, possibly bearing one or more C1–C4 alkyl substituents; said groups Cp may also be Linked with each other by means of a bridge structure of carbon atoms or an alkyl silanic structure; and (b) an aluminoxane co-catalyst.

In particular, in said formula (I) the metal M suitably selected from titanium, zirconium and hafnium, with zirconium and hafnium being preferred.

In the preferred embodiment, $R_1$, $R_2$, R3 and R4 in formula (I) represent, each of them independently from the other ones, an alkyl group of from 1 to 4 carbon atoms, and in the most preferred embodiment, all of $R_1$, $R_2$, $R_3$ and $R_4$ represent the ethyl group.

In said formula (I), Cp is preferably selected from cyclopentadienyl, indenyl and fluorenyl groups, which may be not substituted, or may bear one or more C1–C4 alkyl substituents. When both Cp groups in the compound (I) are connected with each other by a bridge structure, said bridge structure preferably is formed by a linear or branched alkylene group of from 1 to 4 carbon atoms, or is a dialkylsilyl, and, preferably, a dimethylsilyl group. Examples of bridge-connected Cp groups are bis(cyclopentadienyl) ethylene, bis(indenyl) ethylene, (cyclopentadienyl-1-fluorenyl) isopropyl and bis(cyclopentadienyl) dimethylsilyl.

Specific examples of compounds (I) are consequently the following: bis(cyclopentadienyl) bis(ethylamide) zirconium; bis(cyclopentadienyl) bis(ethylamide) hafnium; ethylene-bis(indenyl) bis(ethylamide) zirconium; ethylene-bis(indenyl) bis(ethylamide) hafnium; and isopropyl (cyclopentadienyl-fluorenyl) bis(ethylamide) hafnium.

In those catalysts which are destined to the production of polyolefins with a broadened molecular weight distribution, compounds (I) containing two metals "M" different from each other can be used.

The compound (I) in which both Cp radicals represent the cyclopentadienyl group and all of $R_1$, $R_2$, $R_3$ and $R_4$ represent the ethyl group, can be prepared as described by G. Chandra and M. F. Lapper in J. Chem. Soc. (A), 1968, page 1940.

According to the present Invention, in association with the compound (I) disclosed hereinabove, an aluminoxane is used as co-catalyst.

As known, aluminoxanes are compounds containing Al–O–Al bonds, with a variable O:Al ratio, which can be obtained in the art by causing an alkyl aluminum, or alkyl aluminum halide to react, under controlled conditions, with water, and, in the case of trimethyl aluminum, also with a hydrous salt, such as aluminum sulfate hexahydrate, copper sulfate pentahydrate and iron sulfate pentahydrate. In particular, in the catalyst according to the present invention, said aluminoxane and compound (I) are contained in such proportions that the atomic ratio of aluminum contained in said aluminoxane to the metal of Group IVB contained in the compound (I) is comprised within the range of from 10:1 to $10^8:1$, and preferably of from $10^2:1$ to $10^4:1$.

The catalytic systems according to the present invention are useful in ethylene polymerization to yield linear polyethylene, and in the polymerization of propylene or higher alpha-olefins, to yield atactic, syndiotactic or isotactic polymers, as a function of the particular catalytic composition selected and of the specific polymerization conditions. The catalytic systems are furthermore active in the copolymerization of ethylene with propylene and/or other olefins (formation of LLDPE) and in the terpolymerization of ethylene, propylene and diene. The polymerization can be carried out by means of the suspension technique, in an inert diluent, or in gas phase, with temperatures which generally are comprised within the range of from 20° to 120° C., under a pressure which generally is comprised within the range of from 1 to 300 bars, using a molecular weight regulator agent, such as, e.g., hydrogen.

The following experimental examples are reported in order to better illustrate the invention.

EXAMPLE 1

To an autoclave of 5 liters, of stainless steel, Brignole type, equipped with magnetic-driven anchor stirrer and temperature-controlled by means of electrical resistors, the following are charged:

| | |
|---|---|
| n-Hexane (polymerization grade) | 1,900 ml |
| Catalyst Cp2Zr[N(C$_2$H$_5$)$_2$]$_2$ | 0.00752 g |
| Co-catalyst (MAO* solution at 10% by weight in toluene) | 40 ml |
| Molecular weight regulator agent (H$_2$) | 0.5 bar |
| Ethylene | 14.43 bars |

(*) MAO is oligomeric methyl aluminoxane.

The polymerization is carried out with an atomic ratio of Al:Zr of 2,500:1, under a total pressure of 15 bars, at a temperature of 70° C. and over a polymerization time of 1.0 hour. Under these conditions, 0.258 kg of polyethylene is obtained in a yield of 34.4 kg of polymer per each catalyst gram, corresponding to 138 kg of polymer per each gram of zirconium in the catalyst.

EXAMPLE 2

Ethylene is polymerized in the same way as in above Example 1, with the following variants:

| | |
|---|---|
| Catalyst Cp2Zr[N(C$_2$H$_5$)$_2$]$_2$ | 0.00191 g |
| Co-catalyst (MAO solution at 10% by weight in toluene) | 8.7 ml |

The polymerization is carried out with an atomic ratio of Al:Zr of 2,500:1, during a polymerization time of 1.5 hours. Under these conditions, 0.1625 kg of polyethylene is obtained in a yield of 85 kg of polymer per each catalyst gram, corresponding to 341 kg of polymer per each gram of zirconium in the catalyst.

EXAMPLE 3

Ethylene is polymerized in the same way as in above Example 1, with the following variants:

| | |
|---|---|
| Catalyst Cp2Zr[N(C$_2$H$_5$)$_2$]$_2$ | 0.002 g |
| Co-catalyst (MAO solution at 10% by weight in toluene) | 11 ml |

The polymerization is carried out with an atomic ratio of Al:Zr of 2,500:1, during polymerization time of 1.16 hours. Under these conditions, 0.198 kg of polyethylene is obtained in a yield of 99 kg of polymer per each catalyst gram, corresponding to 398 kg of polymer per each gram of the zirconium in the catalyst.

The resulting polyethylene displays a melt-flow index (ASTM D 1238 E) of 1.78 g/10 minutes.

EXAMPLE 4

Ethylene is polymerized in the same reactor as of Example 1, under the following conditions:

| | |
|---|---|
| n-Hexane (polymerization grade) | 1,900 ml |
| Catalyst Cp2Zr[N(C$_2$H$_5$)$_2$]$_2$ | 0.001 g |
| Co-catalyst (MAO solution at 10% by weight in toluene) | 5.1 ml |
| Molecular weight regulator agent (H$_2$) | 0.5 bar |
| Ethylene | 14.5 bars |

The polymerization is carried out with an atomic ratio of Al:Zr of 2,500:1, under a total pressure of 15 bars, at a temperature of 70° C. and during a polymerization time of 1.5 hours. Under these conditions, 0.166 kg of polyethylene is obtained in a yield of 166 kg of polymer per each catalyst gram, corresponding to 664 kg of polymer per each gram of zirconium in the catalyst.

The so obtained polyethylene displays the following characteristics:

| | |
|---|---|
| Melt-flow index (ASTM D 1238 E) | 8.8 g/10 minutes |
| Melt-flow index (ASTM D 1238 F) | 167.5 g/10 minutes |
| Shear sensitivity | 19 |
| Density (23° C.) | 0.9630 g/ml |

EXAMPLE 5

Ethylene is polymerized in the same reactor as of Example 1, under the following conditions:

| | |
|---|---|
| n-Hexane (polymerization grade) | 1,900 ml |
| Catalyst Cp2Zr[N(C$_2$H$_5$)$_2$]$_2$ | 0.0007 g |
| Co-catalyst (MAO solution at 10% by weight in toluene) | 3.8 ml |
| Molecular weight regulator agent (H$_2$) | 0.5 bar |
| Ethylene | 14.5 bars |

The polymerization is carried out with an atomic ratio of Al:Zr of 2,500:1, under a total pressure of 15 bars, at a temperature of 40° C. and during a polymerization time of 1.5 hours. Under these conditions, 0.166 kg of polyethylene is obtained in a yield of 33 kg of polymer per each catalyst gram, corresponding to 132 kg of polymer per each gram of zirconium in the catalyst.

The so obtained polyethylene displays the following characteristics:

| | |
|---|---|
| Melt-flow index (ASTM D 1238 E) | 6.01 g/10 min. |
| Melt-flow index (ASTM D 1238 F) | 162.9 g/10 min. |
| Shear sensitivity | 27.1 |

EXAMPLE 6

Ethylene is polymerized in the same reactor as of Example 1, under the following conditions:

| | |
|---|---|
| n-Hexane (polymerization grade) | 1,900 ml |
| Catalyst Cp2Zr[N(C$_2$H$_5$)$_2$]$_2$ | 0.0007 g |
| Co-catalyst (MAO solution at 10% by weight in toluene) | 3.8 ml |
| Molecular weight regulator agent (H$_2$) | 0.05 bar |
| Ethylene | 12.5 bars |

The polymerization is carried out with an atomic ratio of Al:Zr of 2,500:1, under a total pressure of 15 bars, at a temperature of 120° C. and during a polymerization time of 1.5 hours. Under these conditions, 0.0333 kg of polyethylene is obtained in a yield of 48 kg of polymer per each catalyst gram, corresponding to 191 kg of polymer per each gram of zirconium in the catalyst.

The so obtained polyethylene displays the following characteristics:

| | |
|---|---|
| Melt-flow index (ASTM D 1238 E) | 4.12 g/10 minutes |
| Melt-flow index (ASTM D 1238 F) | 72.3 g/10 minutes |
| Shear sensitivity | 17.6 |
| Density (23° C.) | 0.9517 g/ml |

We claim:

1. Catalyst for the (co)polymerization of ethylene and other alpha-olefins, formed by:

(a) a bis(cyclopentadienyl) bis(amide) derivative of an element of Group IVB of the Periodic Table of the Elements, to be defined by means of the formula:

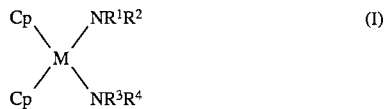

(I)

wherein: M represents zirconium, $R^1$, $R^2$, $R^3$ and $R^4$ represent, each of them independently from the other ones, an alkyl group of from 1 to 8 carbon atoms, a cycloalkyl group of from 5 to 8 carbon atoms, or a phenyl group; and each Cp independently represents a substituted or unsubstituted cyclopentadienyl, indenyl or fluorenyl group, with zero or more C1–C4 alkyl substituents; or said groups Cp are linked with each other by means of a bridge structure of carbon atoms or an alkyl silanic structure; and (b) an aluminoxane co-catalyst.

2. Catalyst according to claim 1, characterized in that $R_1$, $R_2$, $R_3$ and $R_4$ in formula (I) represent, each of them independently from the other ones, an alkyl group of from 1 to 4 carbon atoms.

3. Catalyst according to claim 1, characterized in that the Cp moieties, in said formula (I), individually represent a cyclopentadienyl, indenyl and fluorenyl group, which may be not substituted or may bear one or more C1–C4 alkyl substituents.

4. Catalyst according to claim 1, characterized in that the compound of said formula (I) is selected from the group consisting of bis(cyclopentadienyl) bis(ethylamide) zirconium; and ethylene-bis(indenyl) bis(ethylamide) zirconium.

5. Catalyst according to claim 1, characterized in that the atomic ratio of aluminum contained in the co-catalyst (b) to the Group IVB metal contained in the compound (I) is comprised within the range of from 10:1 to $10^8$:1.

6. The catalyst according to claim 1, wherein $R_1$, $R_2$, $R_3$ and $R_4$ are ethyl groups.

7. The catalyst according to claim 1, wherein both Cp groups jointly represent a bis(cyclopentadienyl)ethylene, bis(indenyl)ethylene, bis(cyclopentadienyl-1-fluorenyl) isopropyl or a bis(cyclopentadienyl)dimethyl silyl group.

8. The catalyst according to claim 1, wherein the atomic ratio of aluminum contained in the co-catalyst (b) to the Group IVB metal contained in the compound (I) is comprised within the range of from $10^2$:1 to $10^4$:1.

* * * * *